United States Patent [19]

Shunta

[11] 4,222,751
[45] Sep. 16, 1980

[54] LIQUID PUMP WITH GAS SEPARATING MEANS

[75] Inventor: Richard F. Shunta, N. Muskegon, Mich.

[73] Assignee: Anthes Imperial Limited, Ontario, Canada

[21] Appl. No.: 937,537

[22] Filed: Aug. 28, 1978

[51] Int. Cl.² .............................................. B01D 19/00
[52] U.S. Cl. ........................................ 55/204; 55/182; 415/49
[58] Field of Search ........................... 55/182, 201–207; 137/434; 415/49, 53 R

[56] References Cited

U.S. PATENT DOCUMENTS

| | | | |
|---|---|---|---|
| 2,752,936 | 7/1956 | Cantalupo | 137/434 X |
| 3,096,783 | 7/1963 | Dale | 137/434 |
| 3,290,864 | 12/1966 | Harker et al. | 55/203 |
| 3,363,569 | 1/1968 | Roosa | 55/204 |
| 3,397,512 | 8/1968 | Webb | 55/204 |
| 3,715,863 | 2/1973 | Zanoni | 55/204 |

Primary Examiner—Robert H. Spitzer
Attorney, Agent, or Firm—Price, Heneveld, Huizenga & Cooper

[57] ABSTRACT

A gasoline pump includes a cyclone air separator by which air is removed from the gasoline being pumped. The air is vented to the atmosphere through a vent chamber. The cyclone separator includes a scavenging tube for capturing the air bubbles and is coupled to an orifice between the separator and the vent chamber. The scavenging tube and orifice have diameters selected to capture substantially all of the air bubbles and a float valve couples the vent chamber to the pump inlet to return entrained gasoline to the pump. A damped output control valve regulates the internal pump pressure so the cone of air bubbles formed in the cyclone separator remains relatively constant and is efficiently captured by the scavenger tube.

19 Claims, 6 Drawing Figures

LIQUID PUMP WITH GAS SEPARATING MEANS

BACKGROUND OF THE INVENTION

The present invention relates to fluid pumps and particularly a fluid pump with means for separating gas from the fluid being pumped.

In fluid pumps and particularly in gasoline pumps, gas or air leaks on the inlet side of the pump causes air to mix with the liquid output of the pump which then is less than the metered amount. This is a particularly troublesome problem in the gasoline dispensing art where the consumer is paying for gasoline and regulations require the amount of air in the pumped gasoline to be held to a minimum so that the consumer receives relatively pure gasoline for the metered amount of gasoline pumped. As the price of gasoline increases, the desirability of eliminating metering error from the fuel dispensed naturally increases.

In U.S. Pat. No. 3,715,863, issued to P. Zanoni on Feb. 13, 1973, and assigned to the present assignee, a gasoline pump is disclosed which has heretofore provided an adequate solution to the air problems associated with gasoline pumps. With such apparatus, however, it is still possible for an amount of up to 4 percent of air to gasoline by volume mixture to still be pumped through the system. In many markets, the air must be less than 0.5 percent of the output mixture and such improved performance naturally is desirable in all markets in any pump operation.

In gasoline pumps, the air removal efficiency is measured by providing a series of test orifices, on the pump inlet to admit air to the gasoline inlet. These orifices range in size from 0.1 millimeter and increase in increments of 0.1 millimeter until the point is reached where the pump breaks suction stopping the delivery of product. With a test orifice of 1.2 millimeters, the air bubble cone in the cyclone separating chamber of the prior art pump represented by U.S. Pat. No. 3,715,863 becomes larger in diameter than the scavenging tube thereby bypassing the separating chamber and mixing with the gasoline at the outlet which results in a metering error of approximately 4 percent. If the scavenger tube and orifice is increased in diameter without other pump modifications, the scavenger tube also admits an increased flow rate of entrained gasoline which enters the ventilating chamber and must be returned to the pump inlet. Thus, for example, by increasing the diameter of the scavenging tube from ½ to ¾ inches in diameter, and the 0.089 orifice to 0.150 inches, it was found that the flow rate of gasoline into the vent chamber increases from one gallon per minute to 2.5 gallons per minute. This causes gasoline to be dispelled from the air vent since the float valve incorporated in the prior art device is unable to handle the additional bypass gasoline. In addition, it was discovered that the control valve at the outlet of the pump pulsates or hunts for an equilibrium position with the nozzle in the full open position. This is due in part to the air expanding at the outlet reducing the pressure against the valve until the spring counterpressure closes the valve which cycle repeats causing valve chattering.

If the air allowed to enter the inlet side of the pump through a test orifice of 1.2 millimeters in diameter or larger such as occurs in the field when an air leak exists in the input pipe leading from the storage tank to the pump, the cyclone separator air bubble cone naturally increases to a size which is not effectively captured by the relatively small diameter scavenging tube and the control valve hunting becomes markedly increased greatly decreasing the efficiency of operation of the pump and introducing a greater amount of air to the fuel mixture at the outlet of the pump.

In order to provide a pump, therefore, with improved air elimination performance under almost unlimited air conditions, the interrelated scavenging tube, float valve, and control valve criteria must be taken into account to provide improved performance possible with the pump of the present invention.

SUMMARY OF THE INVENTION

Pumps embodying the present invention include an inlet leading to a rotary pump having an outlet coupled to a cyclone separator chamber including a scavenging tube axially aligned with the cyclone chamber and communicating with an orifice extending between the separating chamber and a venting chamber. The scavenger tube diameter and orifice size are selected to accommodate a relatively large cone of air bubbles present in the cyclone separator and to permit a correspondingly increased flow of entrained gasoline to enter the vent chamber. Valve means are provided between the vent chamber and the pump inlet to accommodate the increased flow of entrained gasoline and a control valve positioned at the outlet of the pump prevents internal pump pressure surges such that the cone of air bubbles remains relatively constant and smaller than the diameter of the scavenging tube.

These and other features, advantages, and objects of the present invention can best be understood by reference to the following description thereof together with the drawings, in which:

DETAILED DESCRIPTION OF THE PREFERRED EMBODIMENT

Figure 1:
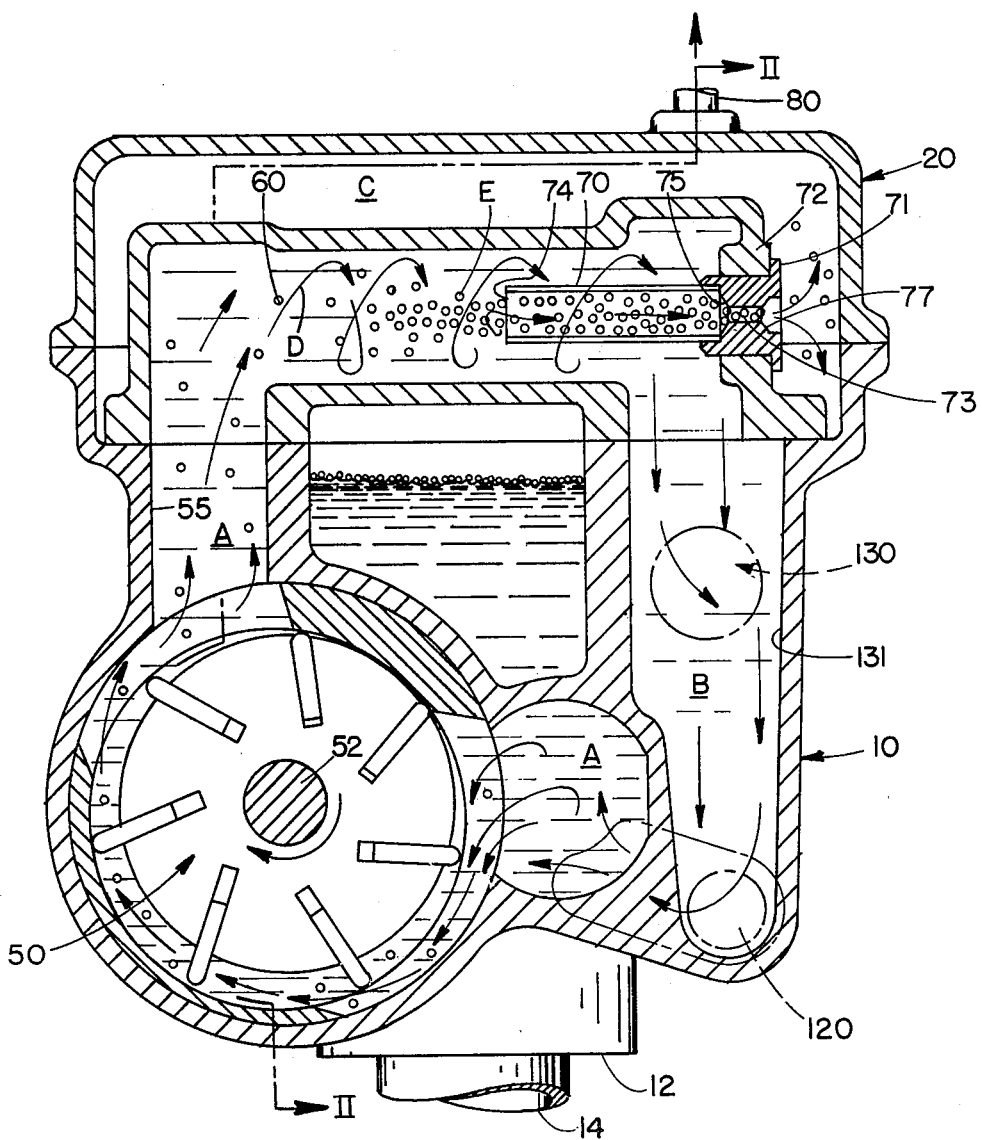
FIG. 1 is a partial cross-sectional view of a pump embodying the present invention.
Figure 2:
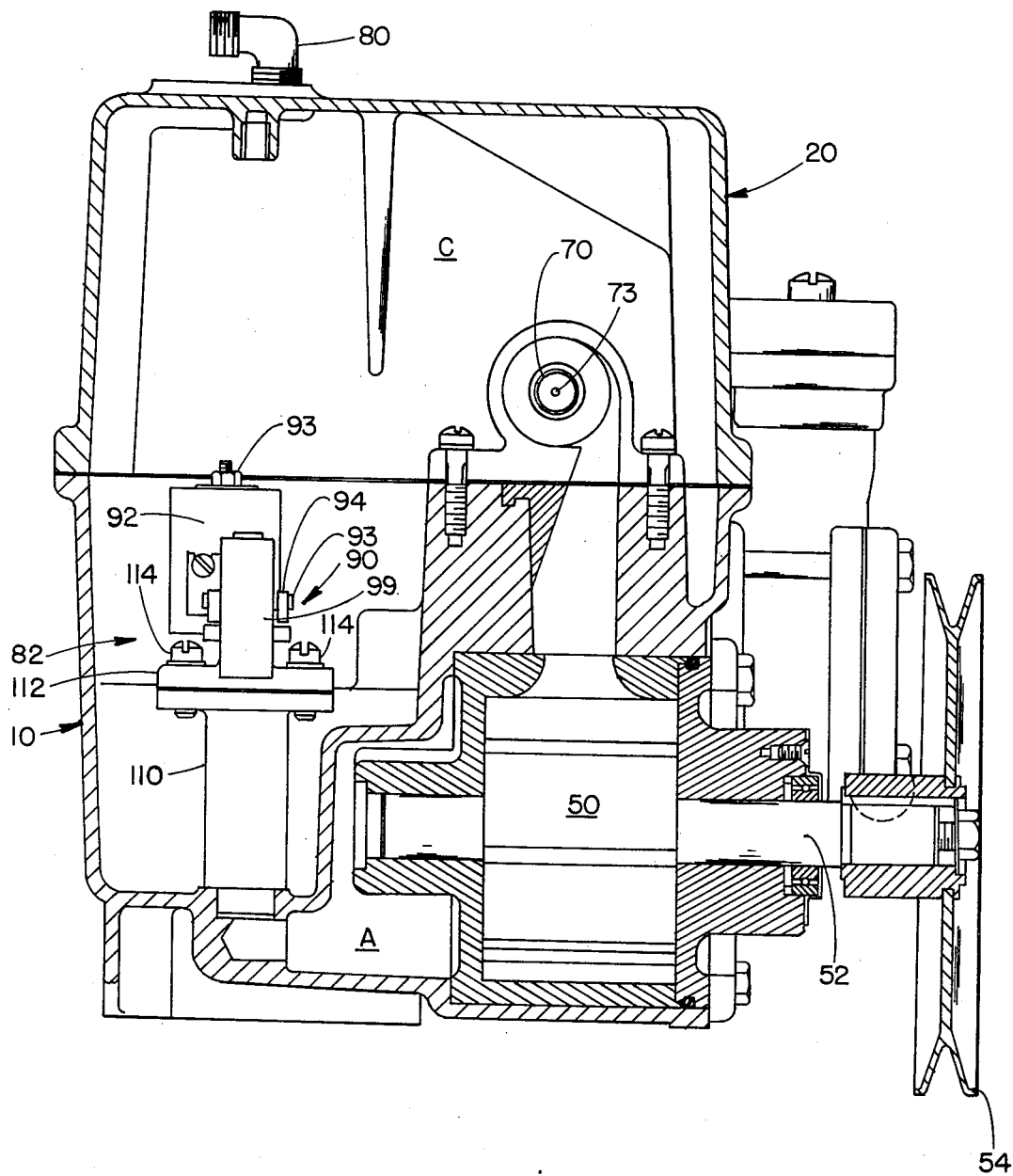
FIG. 2 is a cross-sectional view of the pump shown in FIG. 1 taken along the section lines II—II of FIG. 1.
Figure 3:
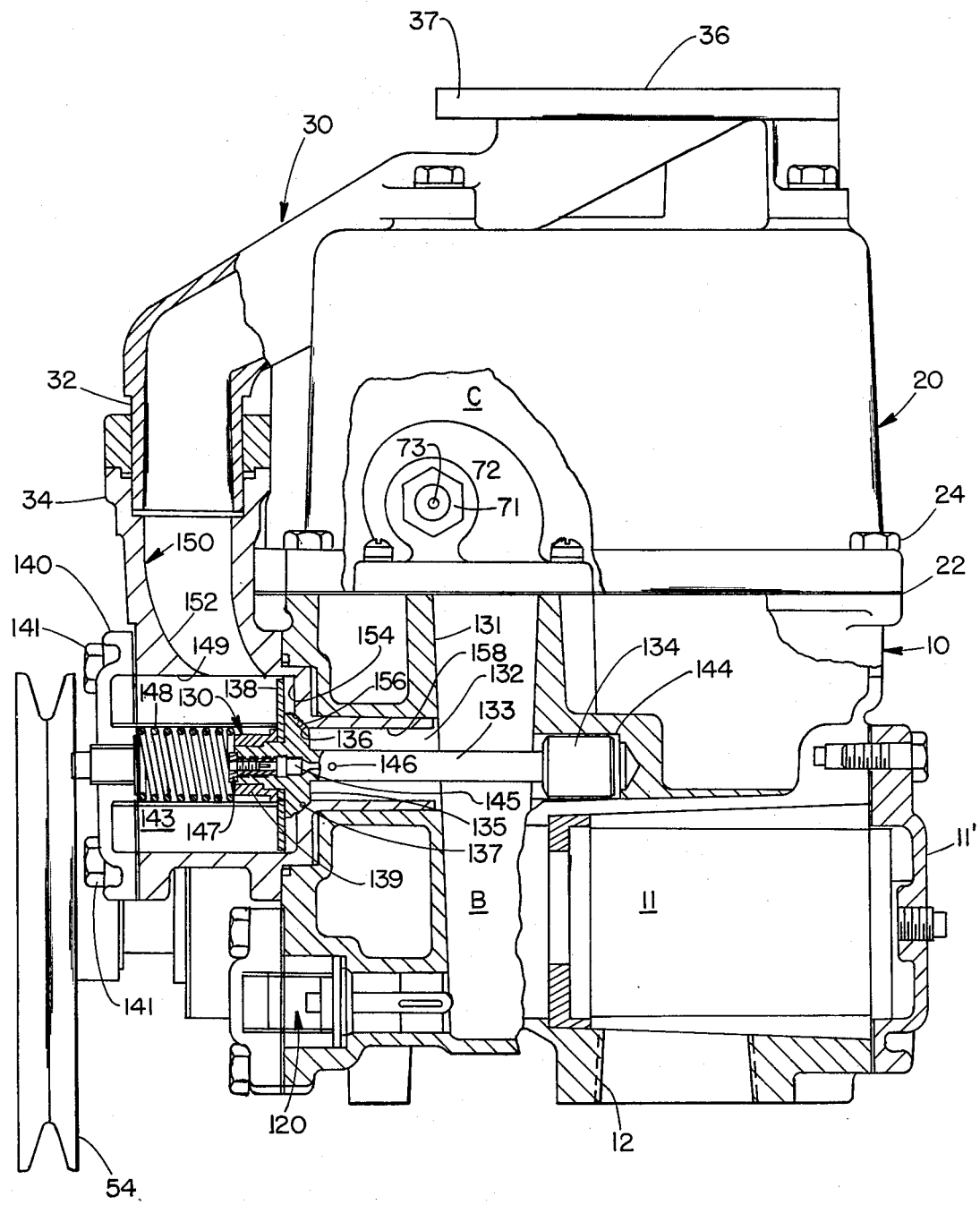
FIG. 3 is a fragmentary cross-sectional view of the pump as viewed from the side opposite that shown in FIG. 2.

The liquid pump apparatus of the present invention as best seen in FIGS. 1 through 3 includes a lower housing 10 having an inlet 12 for receiving a conduit 14 extending from the pump inlet to a fuel storage tank when the pump is used for dispensing gasoline or diesel fuel. Inlet 12 communicates with a cartridge filter 11 fitted in housing 10 by means of an end cap 11'. The pump includes an upper housing 20 sealably secured to the lower housing by means of a gasket 22 and a plurality of fastening bolts 24. Each of the housings are cast of a suitable aluminum alloy material. Coupled to upper housing 20 is an outlet manifold 30 having an inlet pipe 32 coupled to a fluid outlet 34 formed in a discharge mainfold 150 in turn secured to the lower housing 10 by a cover plate 140 and suitable bolts 141. The outlet manifold 30 includes an outlet 36 surrounded by a flange 37 to which the fuel dispensing conduits are coupled. Housings 10 and 20 are substantially identical to the pump housings described in U.S. Pat. No. 3,715,863, the disclosure of which is incorporated herein by reference. A brief description of the chambers defined by these housings and the flow of fluid therethrough, however, is presented here.

Inlet 12 of the pump communicates with a first generally U-shaped chamber A which includes a rotary pump 50 driven by a shaft 52 extending from housing 10 outwardly to a drive pulley 54. Pulley 54 is coupled by a drive belt to a suitable drive motor. The outlet side of the pump 50 as best seen in FIG. 1 is coupled to a horizontally extending cyclone chamber 60 by conduit portion 55. The conical cyclone chamber 60 receives fluids from the output of pump 50 which may include a small percentage of air and swirls the fluid as indicated by the arrows D in FIG. 1 in a helical path with the lighter air bubbles (E in FIG. 1) converging toward the center of the helix along the axis of the elongated cylindrical chamber 60. As the bubbles E progress in the axial direction of the cylindrical chamber, they converge toward the center in a tapered cone and are captured by a scavenging tube 70 mounted to plug 71 in turn fitted in end wall 72 separating chamber A from a vent chamber C. Plug 71 includes an orifice 73 for passing the captured air bubbles E as well as a small amount of entrained fuel which naturally also will be captured by the scavenging tube 70. As seen in FIG. 1, as the flow of air bubbles and fuel progress from left to right in the FIG., the bubbles converge to enter the open end 74 of tube 70 which is approximately 3 inches in length and has an outer diameter of ¾ inch with a wall thickness of 1/32 inch. Orifice 73 has a diameter of 0.15 inches with tube 70 press-fit into a cylindrical opening in the end of plug 71. The orifice 73 is spanned on opposite sides by tapered surfaces 75 and 77 to enhance the collection and passage of air bubbles and entrained fuel therethrough. The tube and orifice diameter is enlarged from ½ to ¾ inches diameter and from 0.089 inches to 0.15 inches, respectively, as compared to the prior art represented in U.S. Pat. No. 3,715,863. With the larger diameter orifice 73, a greater amount of entrained fuel also flows into the venting chamber C integrally formed in the upper housing 20. With the increased diameter orifice, approximately 2.5 gallons per minute of entrained fuel enters the vent chamber C as compared to 1 gallon per minute with the prior art.

Figure 5:
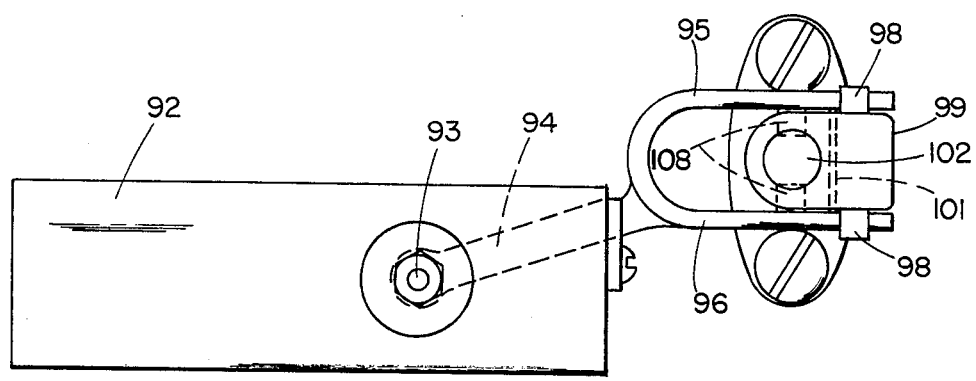
FIG. 5 is a plan view of the valve means shown in FIG. 4.
Figure 4:
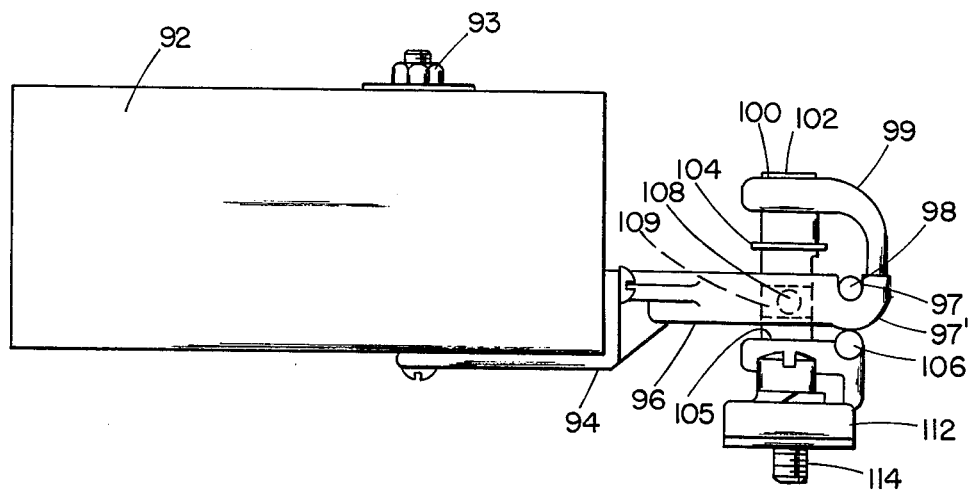
FIG. 4 is a side elevational view of the valve means shown in FIG. 2.
Figure 6:
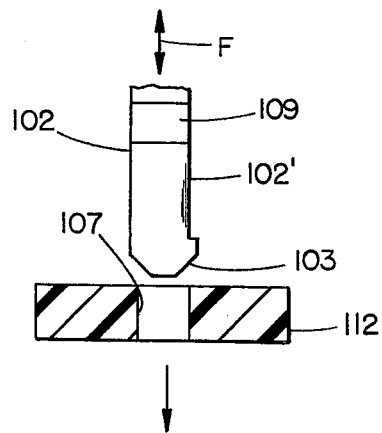
FIG. 6 is an enlarged fragmentary view partly in cross section of the valve plunger and seat shown in FIG. 4.

A vent opening 80 on the top of upper casting 20 communicates with vent chamber C for expelling the air bubbles. The entrained fuel flows to the lower portion 82 of chamber C (FIG. 2) where it is returned to the main chamber A through valve means 90. The valve means 90 has been incorporated in the prior art and includes a buoyant float 92 coupled to a first arm 94 by means of a fastening bolt 93. The end of arm 94 remote from the float is generally U-shaped including a pair of legs 95 and 96 as best seen in FIG. 5. Between legs 95 and 96 is a support leg 101 for reinforcing the ends of the arms. The ends of arms 95,96 each include a curved pin receiving recess 97 for pivoting about a pin 98 extending through a mounting bracket 99. Bracket 99 includes an upper aperture 100 for slidably carrying the valve stem 102 thereon with a keeper key 104 limiting the upper motion of the valve stem 102. Bracket 99 also includes a lower guide aperture 105 (FIG. 4) for stem 102. A second rod 106 from bracket 99 contacts the curved outer surface 97' of arms 96 and 95 providing a sliding support thereof for the arms. Pins 108 extend inwardly from arms 95 and 96 into rectangular recesses 109 (FIGS. 4 and 6) in opposite sides of valve stem 102 and forms the means by which the valve stem is raised and lowered as indicated by arrow F in FIG. 6 by the float 92 as fuel causes a buoyant force to raise the float upwardly such that the lower tapered end 103 of valve stem 102 lifts away from valve seat and fuel flow aperture 107 as best seen in FIG. 6. Aperture 107 has a diameter of 5/16 inches to accommodate the flow of entrained flow introduced into chamber C through orifice 73. Valve stem 102 includes a flat 102' (FIGS. 4 and 6) formed thereon to provide clearance for arm 101.

Bracket 99 is secured to a hollow mounting boss 110 (FIG. 2) and is secured thereto by means of an integrally formed flange 112 and valve seat and suitable fastening means 114.

The pivot point for the float valve means 90 is pin 98 thus multiplying the buoyant force on the float 92 by the ratio of the distance between pivot pin 98 and the center of force against float 92 by the distance between pivot point 98 and pins 108. By providing the forced multiplication linkage best seen in FIGS. 4 and 5, a relatively small float 92 can be used in chamber C thereby permitting the valve means 90 to rapidly open to accommodate the increased fuel flow and preventing discharge of fuel from chamber C through vent 80. The fuel in chamber C is the entrained fuel and is bypassed to the main chamber A by means of the valve and the hollow boss 110.

The pure fuel (i.e., with the air bubbles separated) as best seen in FIG. 1 flows downwardly in chamber B (FIG. 1) located below the scavenging tube 70 to an output control valve 130 through a cylindrical passageway 131 (FIGS. 1 and 3). A cylindrical passageway 132 extends through the side of housing 10 for receiving a discharge manifold 150 which is bolted to housing 10. Manifold 150 includes a curved discharge port 152 communicating with its central cylindrical cavity 154. Cavity 154 has a first open end permitting insertion of the control valve 130 which is covered by cover plate 140 by bolts 141 once the valve is installed. The second end of cavity 154 is recessed about 0.4 inches beyond the edge of port 152 and includes a tapered valve seat 156 at the edge of a cylindrical neck 158 which extends into aperture 132 of housing 10.

The control valve 130 includes a valve stem 133 having a piston 134 integrally formed at one end fitted within an aperture 144 formed in housing 110 to define a dash pot damper lubricated by the fuel being pumped by the pump. At the opposite end of piston 134 the stem terminates in a valve head 135 having a tapered seat 136 mating with the valve seat 156. Seat 136 includes an annular recess for receiving a sealing O-ring 137. Behind head 135 there is provided a valve disc 138 held in place by bushing 139 pressed onto valve head 135 which projects through the disc 138. The valve head includes an axially extending aperture 145 formed from the left end through and into the stem 133 terminating in a radially extending aperture 146. A needle valve 147 is threadably secured in aperture 145 of the valve head. Valve 147 bleeds fuel at an excess pressure of from 30-50 psi from a dispensing hose when not in use through axial aperture 145 behind the valve head in the space 132 through scavenging orifice 73 and into vent chamber C. A bias spring 148 is positioned behind the valve plate 138 and compressibly urges the valve to a normally closed position as shown in FIG. 3 when compressed by cover plate 140.

By providing recess 154, as the valve 130 begins to open, the fluid acts against the relatively large surface area of backing disc 138 which is closely fitted to bore 149 of chamber 143 so the valve has to back fully away from the seat before the fuel is dispensed. As the fuel dispensing nozzle is opened, the back pressure in conduit 152 is reduced and the fluid output pressure from pump 50 causes the valve 130 to move axially to the left in FIG. 3 and fully open. With the aid of the enlarged backing disc 138 which provides control for the valve in the space within recess 154 and the dash pot damping piston 134, the valve 130 will not hunt in seeking an equilibrium position but operates smoothly thereby preventing pressure surges within the pump. Such pressure surges cause the air bubble cone shown in FIG. 1 to enlarge at the low pressure point and not be captured by the scavenging tube.

It has been found that with the pump described and disclosed herein, with test air inlet orifices at inlet 12 in sizes from 0.8 millimeters to 1.8 millimeters, the percentage of air in the fuel discharge ranges from 0.08 percent to approximately 0.5 percent. This improvement in performance represents an order of magnitude improvement over the prior art devices. Thus, by discovering the source and nature of the problem, applicant has, by changing the interrelated design parameters of the prior art pump, provided a pump with vastly improved air elimination performance.

It will become apparent to those skilled in the art that various modifications to the preferred embodiment of the invention as described and disclosed herein can be made without departing from the spirit or scope of the invention as defined by the appended claims.

The embodiments of the invention in which an exclusive property or privilege is claimed are defined as follows:

1. A fluid pump for dispensing fuel from storage tanks, and substantially eliminating air from the fuel being pumped, said pump comprising:
   a housing having a fluid inlet, a fluid outlet and an air outlet, said housing defining a pump cavity including a pump therein coupled between said inlet and said outlet and a cylindrical cyclone separator, said housing further defining a vent cavity with a wall separating said cyclone separator and said vent cavity wherein said wall includes an orifice axially aligned with the axis of said cylindrical cyclone separator;
   a scavenging tube extending into said cylindrical cyclone separator in coaxial relationship to said orifice, said scavenging tube and said orifice having diameters selected to capture substantially all air bubbles forming a cone in the cyclone separator; and
   a pressure activated control valve coupled to said fluid outlet and having a damper connected therewith to alleviate sudden opening and closing of said control valve and consequent pressure surges in the pump, thereby maintaining the size of the cone of air bubbles relatively constant during pump operation for effective elimination of the air bubbles from the fuel.

2. The pump as defined in claim 1 wherein said orifice has a diameter of about 0.15 inches.

3. The pump as defined in claim 2 wherein said scavenging tube is a cylinder having an outside diameter of about ¾ inches and a wall thickness of about 1/32 inches.

4. The pump as defined in claim 3 and further including float valve means and a fluid flow passageway coupling said vent cavity to said pump cavity, said float valve means comprising a float, a valve stem, and lever means coupling said float to said valve stem which is movable to selectively open and close said fluid flow passageway to return entrained fluid to said pump cavity.

5. The pump as defined in claim 4 wherein said fluid flow passageway has a diameter of about 5/16 inches.

6. The pump as defined in claim 5 wherein said housing includes a piston receiving aperture and wherein said control valve includes a valve stem having a piston at one end extending into said piston receiving aperture to damp the movement of said control valve.

7. The pump as defined in claim 1 wherein said control valve includes a valve stem having a valve head at one end and said damper includes a piston at the opposite end of said valve stem and a piston receiving aperture formed in said housing.

8. The pump as defined in claim 7 wherein said housing includes a recess having a valve seat at one end for sealably receiving said valve head, wherein said valve seat is smaller than said recess and an outlet communicating with said recess at an end remote from said seat.

9. The pump as defined in claim 8 wherein said valve head includes a backing disc closely fitted within said recess and acted upon by fluid pressure when the valve initially moves away from said valve seat to move said valve to an open position for the discharge of fluid through said outlet.

10. The pump as defined in claim 9 wherein said orifice has a diameter of about 0.15 inches.

11. The pump as defined in claim 10 wherein said scavenging tube is a cylinder having an outside diameter of about ¾ inches and a wall thickness of about 1/32 inches.

12. The pump as defined in claim 11 and further including float valve means and a fluid flow passageway coupling said third cavity to said first cavity, said float valve means comprising a float, a valve stem, and lever means coupling said float to said valve stem which is movable to selectively open and close said fluid flow passageway to return entrained fluid to said first cavity.

13. The pump as defined in claim 12 wherein said fluid flow passageway has a diameter of about 5/16 inches.

14. A pump for dispensing fuel from storage tanks and separating air and vapor therefrom comprising:
   pump means having an inlet to be coupled to a source of fuel and an outlet;
   an air separator of the tangential entry cyclone type coupled to said outlet of said pump means and operative to separate air and vapor from pure fuel; and
   a pressure activated control valve located downstream of said air separator to discharge the pure fuel from the pump for dispensing fuel, said valve means having a damper connected therewith to prevent hunting during the discharge of fuel, whereby pressure surges internal to the pump are substantially reduced to improve the efficiency of operation of said air separator.

15. The pump as defined in claim 14 wherein said pump includes a housing defining a pump cavity and a vent cavity, said housing having a wall extending between said pump and vent cavities and wherein said air separator includes an orifice through said wall and a scavenging tube having one end surrounding said orifice and an opposite end extending into said cyclone air separator, said tube being axially aligned with the axis of said separator to capture air bubbles formed in said separator.

16. The pump as defined in claim 15 wherein said orifice has a diameter of about 0.15 inches.

17. The pump as defined in claim 16 wherein said scavenging tube is a cylinder having an outside diameter of about ⅜ inches and a wall thickness of about 1/32 inches.

18. The pump as defined in claim 17 and further including float valve means and a fluid flow passageway coupling said vent cavity to said pump cavity, said float valve means comprising a float, a valve stem, and lever means coupling said float to said valve stem which is movable to selectively open and close said fluid flow passageway to return entrained fuel to said pump cavity.

19. The pump as defined in claim 18 wherein said fluid flow passageway has a diameter of about 5/16 inches.

* * * * *